(12) United States Patent
Köhler

(10) Patent No.: US 10,643,657 B1
(45) Date of Patent: May 5, 2020

(54) SIGNAL ACQUISITION APPARATUS AND SIGNAL ACQUISITION METHOD

(71) Applicant: Rohde & Schwarz GmbH & Co. KG, München (DE)

(72) Inventor: Michael Köhler, Rosenheim (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/395,611

(22) Filed: Apr. 26, 2019

(51) Int. Cl.
*G06F 3/00* (2006.01)
*G11B 20/10* (2006.01)
*G06F 3/06* (2006.01)

(52) U.S. Cl.
CPC .......... *G11B 20/10527* (2013.01); *G06F 3/06* (2013.01); *G06F 2003/0691* (2013.01); *G11B 2020/10666* (2013.01)

(58) Field of Classification Search
CPC ......... G06F 12/00; H04L 67/02; H04L 67/22; H04L 67/10
USPC .......................................................... 710/52
See application file for complete search history.

(56) References Cited

U.S. PATENT DOCUMENTS

| 5,313,622 | A   | * | 5/1994  | Truchard  | G04G 99/00  |
|           |     |   |         |           | 714/814     |
| 6,624,829 | B1  | * | 9/2003  | Beck      | G06F 11/25  |
|           |     |   |         |           | 702/117     |
| 6,662,313 | B1  | * | 12/2003 | Swanson   | G01R 31/31852 |
|           |     |   |         |           | 714/30      |
| 2011/0206176 | A1 | * | 8/2011 | Hutchings | G06M 3/00   |
|           |     |   |         |           | 377/26      |
| 2013/0158923 | A1 | * | 6/2013 | Stanton   | G01R 13/0254 |
|           |     |   |         |           | 702/76      |
| 2014/0047198 | A1 | * | 2/2014 | Stein     | G01R 13/0254 |
|           |     |   |         |           | 711/154     |

* cited by examiner

*Primary Examiner* — Titus Wong
(74) *Attorney, Agent, or Firm* — Westman, Champlin & Koehler, P.A.

(57) ABSTRACT

A signal acquisition of a signal based on specific trigger events is provided. In particular, a separate segment of an input signal is stored for each trigger event. Thus, each trigger event generates separate data comprising data relating to a specific period of time in association with a corresponding trigger event.

18 Claims, 2 Drawing Sheets

SIGNAL ACQUISITION APPARATUS AND SIGNAL ACQUISITION METHOD

TECHNICAL FIELD

The present invention relates to a signal acquisition apparatus and a signal acquisition method. In particular, the present invention relates to an acquisition of a signal triggered by multiple trigger events.

BACKGROUND

Even so applicable in principle to any measurement system for acquiring signal sequences, the present invention and its underlying problem will be hereinafter described in connection with an acquisition of sequent sequences by means of an oscilloscope.

In order to measure and visualize a test signal, a measurement apparatus, for instance an oscilloscope, may continuously receive the test signal. Upon detecting a predetermined property in the received signal, the received signal may be recorded for a predetermined period of time. For this purpose, the measurement apparatus may continuously monitor the received test signal in order to detect one or more specific properties. When such a predetermined property is detected, a trigger signal may be issued, and based on the trigger signal, a recording of the received test signal may be started. After the test signal has been recorded for a specific period of time, the measurement operation may be terminated, or the measurement apparatus may again monitor the test signal for a further trigger event.

However, no detection of trigger events is performed during the recording of a signal sequence. Thus, if one or more further trigger events occur, while a signal sequence is recorded, such trigger events may be easily overlooked.

Against this background, the present invention aims to provide an improved acquisition of signal sequences. In particular, the present invention aims to provide a signal acquisition taking into account fast repetitions of trigger events.

SUMMARY

The present invention provides a signal acquisition apparatus and a signal acquisition method with the features of the independent claims. Further advantageous embodiments are subject-matter of the dependent claims.

According to a first aspect, a signal acquisition apparatus is provided. The apparatus comprises an input device, a number of at least two signal memories, a trigger device and an acquisition device. The input device is configured to receive an input signal. The number of memories comprises at least a first signal memory and a second signal memory. The trigger device is configured to output a trigger signal when a trigger event is detected. In particular, a first trigger signal is output when a first trigger event is detected, and a second trigger signal is output when a second trigger event is detected. The acquisition device is configured to receive the trigger signals from the trigger device. The acquisition device is further configured to store a predetermined segment of the received input signal in one of the signal memories when a trigger event is generated and received by the acquisition device. In particular, a first segment of the received input signal is stored in the first signal memory when the first trigger signal is generated and provided to the acquisition device, and a second segment of the received input signal is stored in the second signal memory when the second trigger signal is generated and provided to the acquisition device.

According to a second aspect, a signal acquisition method is provided. The method comprises a step of receiving an input signal. The input signal may be received by an input device. The method further comprises generating trigger signals when detecting a trigger event in the received input signal. The generation of the trigger signals may be performed by a trigger device. In particular, a first trigger signal is generated when a first trigger event is detected, and a second trigger signal is generated, when a second trigger event is detected. The method further comprises storing a predetermined segment of the received input signals in one of the number of memories. In particular, the storing of the segment is performed when a trigger signal is generated. The storing of the segment of the received input signal may be performed by an acquisition device. The first segment of the received input signal is stored in the first signal memory when the first trigger event is generated. A second segment of the received input signal is stored in the second signal memory when the second trigger signal is generated.

The present invention is based on the finding that further trigger events may occur during a recording of a signal sequence, which has been initiated by a previous trigger event. In such a case, the further trigger event may be not taken into account. Even if the further trigger event might be taken into account, only a single signal sequence would be recorded comprising a signal sequence relating to the multiple trigger events. This makes it rather difficult to consider the circumstances of each trigger event separately.

It is therefore an idea of the present invention to consider each trigger event in a measurement signal separately. In particular, it is an idea of the present invention to perform a separate recording of a signal sequence for each and every trigger event of a signal. Thus, if a recording of a first signal sequence based on a first trigger event has been not completed and a further trigger event is detected in an input signal, a further recording of an additional signal sequence is started. In this way, a separate signal sequence is recorded for each detected trigger event in an input signal. This makes it possible to easily analyze the signal sequence related to each trigger event separately.

The input device may be any kind of device for receiving a signal. For example, the input signal may be an analogue signal, which is provided to the input device. Accordingly, the input device may receive the analogue signal and forward the analogue signal to the trigger device and the acquisition device. Alternatively, the input device may comprise an analogue-to-digital converter for converting the received analogue signal to digital data, and to provide the digital data to the trigger device and the acquisition device. Furthermore, it may be also possible to provide the input signal to the input device in digital form. In this case, the input device may forward the received digital data to the trigger device and the acquisition device.

The input device may comprise, for example, an input terminal, e.g. a connector, for connecting a cable. In this way, the input device may be connected with a device under test by means of the cable. However, it may be also possible to receive wireless signals by means of an antenna and to forward the received wireless signals from the antenna to the input device.

The trigger device may be electrically coupled with the input device. Accordingly, the trigger device may analyze the received input signal for identifying predetermined characteristics of the input signal. Such predetermined characteristics may be, for example, a signal value falling below a predetermined value or exceeding a predetermined value, or any other characteristic properties in the signal curve. Furthermore, a trigger event may be also caused by a specific time lapse, i.e. a specific period of time without an occurrence of a predetermined characteristic in the received signal. It is understood, that any other property for initiating a trigger event may be also possible. The analysis of the input signal by the trigger device may be performed in analogue or digital domain. For example, if the input signal is received and forwarded to the trigger device as an analogue signal, the trigger device may detect a trigger event in the analogue domain. Alternatively, the trigger device may convert a received analogue signal in digital data and perform an analysis of the signal in the digital domain. If the input signal is received as a digital signal, the analysis and identification of trigger events may be also performed in the digital domain.

When a trigger event occurs, the trigger device may output an appropriate trigger signal. In particular, if multiple different trigger events may be detected by the trigger device, different trigger signals may be output by the trigger device, respectively. Alternatively, a same trigger signal may be output for each trigger event.

The acquisition device may receive the input signal from the input device and control a process of storing segments of the received input signal in the signal memories. In particular, each segment of the input signal is stored in one of the signal memories. The storage of the segments of the input signal is initiated based on the trigger signals provided by the trigger device. A segment of the input signal relates to data of a specific part of the input signal. For example, each segment may comprise data of the input signal of a specific period of time. For example, a segment may comprise data of the input signal starting at a point of time when a trigger event is detected. However, it may be also possible that the segment may comprise data relating to a specific period of time before the trigger event has been detected at least in part.

Accordingly, the acquisition device may store a separate segment of the received input signal for each trigger event, which has been detected by the trigger device in the input signal. In particular, a separate memory of the number of signal memories may be used for each segment of the input signal.

The segments of the input signal may be stored in the signal memories as digital data. Thus, if the input signal is received as a digital signal, the digital data may be directly used for generating the respective segment. However, it may be also possible to change the sampling rate or resolution of the received digital data. If the input signal is obtained as an analogue signal, the analogue signal may be converted to a digital signal by an analogue-to-digital converter. For example, the analogue-to-digital converter may be located at the input device, as already described above. Alternatively, it may be also possible that the analogue-to-digital conversion may be performed by an analogue-to-digital converter included in the acquisition device. Further, the acquisition device may comprise any other kind of devices, for example amplifiers, attenuators, filters or the like for modifying the input signal before digitizing the analogue signal.

The trigger device and/or the acquisition device may comprise hardware elements like e.g. a processing unit. Additionally or alternatively, the trigger device and/or the acquisition device may be software-implemented at least in part. For this purpose, instructions may be stored in a memory that is coupled to a general purpose processor. The processor may execute an operating system that loads and executes the instructions. The processor may be, for example, an Intel processor that runs a Windows or Linux operating system that loads and executes the instructions. Alternatively, the processor may be a processor of a measurement device that may run an embedded operating system for loading and executing the instructions.

Further embodiments of the present invention are subject of the further sub-claims and of the following description referring to the drawings.

In a possible embodiment, the acquisition device may be adapted to identify an overlapping signal portion between the first segment and the second segment of the received input signal. The acquisition device may further copy the overlapping signal portion from the first signal memory to the second signal memory. In particular, the copying of the overlapping portion may be performed if an overlapping signal portion is identified.

By copying an overlapping signal portion from one signal memory to another signal memory, it is possible to reuse the acquired data of the first segment for storing the second segment. In this way, the storing operation for storing multiple sequences with overlapping portions can be simplified and accelerated.

In a possible embodiment, the signal memories may be operated as cyclic memories. In particular, the signal memories may be ring buffers.

Accordingly, the data of the input signal may be continuously stored in one of the signal memories, wherein the oldest data are overwritten by newly received data. In this way, the memory always comprises previous data of the input signal relating to a specific period of time. Thus, data of a period of time before a trigger event are available and may be used when storing a segment of the input signal in a signal memory. For example, only a part of the signal memory may be overwritten after detecting the trigger event. In this way, a part of the segment relates to data before the trigger event and a part of the segment relates to data after the trigger event. After completing the storage of a specific segment, a further signal memory may be used as cyclic memory for storing the data until the next trigger event is detected.

In a possible embodiment, the acquisition apparatus comprises an acquisition memory. The acquisition memory may include the number of signal memories. For example, the number of signal memories may be realized by individual parts of the acquisition memory. In this way, a very simple and efficient configuration for the number of signal memories can be achieved by an acquisition memory.

In a possible embodiment, the acquisition memory may be a cyclic memory. For example, each of the signal memories of the acquisition memory may be configured as cyclic memory as already described above.

Furthermore, the individual cyclic memories of the acquisition memory may be also used in a cyclic manner. For this purpose, the cyclic memory comprising the oldest segment is overwritten when a further trigger event is detected.

In a possible embodiment, the trigger events, in particular the first trigger event and the second trigger event may be based on a number of trigger modes. Additionally or alternatively, the trigger events may be based on a number of trigger conditions.

A first trigger mode may detect an event in the received input signal. For instance, an event may be a characteristic property in the received input signal. The trigger modes may further comprise a mode for detecting a lapse of time. In such a mode, a trigger event is detected if no specific characteristic feature or event is detected in the received input signal for a predetermined period of time. It is understood, that further trigger modes may be also used.

A trigger condition may specify any kind of characteristic in the received input signal. For example, a trigger condition may be a detection of an exceeding over a predetermined value, falling below a predetermined value, detecting a rising or falling edge or lapsing a predetermined period of time.

However, any other kind of characteristic property in the input signal may be also used as a condition for initiating a trigger event.

In a possible embodiment, the predetermined segment may comprise a first portion of the input signal before a point of time of the trigger event and a second portion of the input signal following the point in time of the trigger event. Accordingly, the segment may comprise data relating to the input signal before the trigger event and/or data relating to the input signal after the trigger event.

In a possible embodiment, a length of the first portion relating to the data of the input signal before the trigger event and/or a length of the second portion relating to the data after the trigger event may be set individually for each trigger event, in particular for the first trigger event and the second trigger event. In this way, individual pre-/postrecording of the input signal can be assigned for each trigger event, in particular for each trigger mode or trigger condition.

With the present invention it is therefore now possible to obtain separate recordings of an input signal for each trigger event, which occurs in an input signal. For this purpose a separate segment of data for the input signal is generated for each trigger event, and each segment is stored in a separate memory or a separate portion of a memory. Thus, the analysis of the recorded signal segments can be simplified and accelerated since a specific individual segment with data for the input signal is available for each trigger event, respectively.

BRIEF DESCRIPTION OF THE DRAWINGS

For a more complete understanding of the present invention and advantages thereof, reference is now made to the following description taking in conjunction with the accompanying drawings. The invention is explained in more detail below using exemplary embodiments, which are specified in the schematic figures and the drawings, in which.

Figure 1:
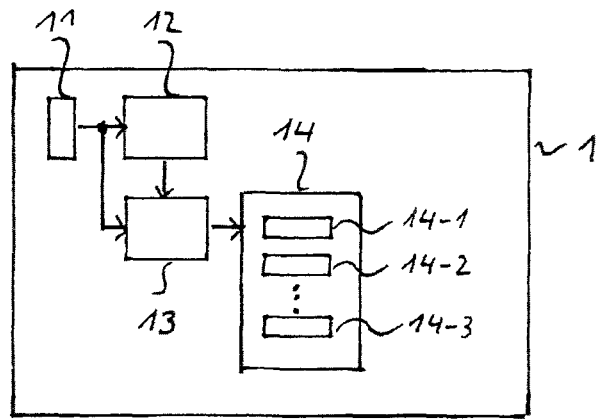
FIG. 1: shows a schematic block diagram of a signal acquisition apparatus according to an embodiment.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown in scale.

In the drawings, same, functionally equivalent and identical operating elements, features and components are provided with same reference signs in each case, unless stated otherwise.

DETAILED DESCRIPTION OF THE DRAWINGS

FIG. 1 shows a block diagram of an embodiment of a signal acquisition apparatus 1. The signal acquisition apparatus 1 comprises an input device 11, a trigger device 12, an acquisition device 13 and a number of signal memories 14-$i$. The number of signal memories 14-$i$ may be included in an acquisition memory 14.

Input device 11 of the signal acquisition apparatus 1 may comprise a number of one or more input terminals, which may be connected with related signal sources. For example, a terminal of the input device 11 may be connected with a measurement point of a device under test by means of a cable. Furthermore, it may be possible to receive a wireless signal by an antenna and to provide the received signal to input device 11. However, any other manner for receiving an input signal by input device 11 may be also possible.

The input signal received by input device 11 may be an analogue signal. The analogue signal may be converted to digital data an analogue-to-digital converter (not shown) of the input device 11. Alternatively, a received analogue signal may be forwarded to the acquisition device 13, and an analogue-to-digital conversion may be performed by an analogue-to-digital converter included in the acquisition device 13. Input device 11 may further comprise additional elements such as filters, attenuators or amplifiers for adapting a received input signal.

Alternatively, it may be also possible that the input device 11 may receive digital data of a digitized input signal. In this case, the digital data may be forwarded to trigger device 12 and acquisition device 13.

Trigger device 12 may monitor the received input signal and detect one or more predefined characteristics in the received input signal. For this purpose, a number of one or more trigger conditions may be detected. For example, each trigger condition may relate to a specific characteristic in the input signal. Such characteristics may be, for example, a detection when the level of the input signal exceeds a predetermined value of falls below a predetermined value. In particular, multiple trigger events relating to different trigger levels may be possible. Furthermore, it may be possible to detect a rising or falling edge in the input signal. It may be also possible to detect a pulse having a predetermined width or any other characteristic feature in the input signal. When the trigger device detects one of the desired trigger conditions, the trigger device may output a trigger signal indicating a trigger event. For example, a same trigger signal may be output each time a specific trigger condition is detected. Alternatively, it may be possible to output individual trigger signals relating to different trigger conditions. In this way, it may be possible to differentiate between the individual trigger conditions.

Furthermore, the trigger device may operate in a specific trigger mode. In particular, multiple different trigger modes may be possible. For example, in a first mode, which may be denoted as a normal mode, the trigger device may output a trigger signal when a predefined trigger condition is detected. As already described above, it may be possible to define multiple different trigger conditions. In this first mode, the trigger device may only output a trigger signal when detecting a trigger condition. In a further trigger mode, which may be denoted as auto or automatic mode, the trigger device may output a trigger signal when detecting a predetermined trigger condition. Further to this, the trigger device may output in this second mode a trigger signal after a predetermined period of time, even if no trigger condition is detected. Further trigger modes may be also possible.

The acquisition device 13 may store data relating to a segment of the input signal in one of the signal memories 14-$i$. A segment of the input signal may relate to data of the input signal for a predetermined period of time. For example, a segment may relate to data of the input signal in a predetermined time window. The data of a segment may start with data of the input signal referring to the point in time when a trigger event has been detected. However, it may be also possible to consider data of the input signal relating to a period of time before the trigger event has been detected. For this purpose, the data of the input signal may be stored continuously in a cyclic memory or a ring buffer. In such a cyclic memory or ring buffer, the oldest data are overwritten by newly received data. In this way, the cyclic memory or ring buffer comprises data referring to a specific period of time before the present point in time. When detecting a trigger event, the recording in the cyclic memory may be stopped or continued for a predetermined period of time. In this way, it is possible to control the amount of data relating to data of the input signal before the trigger event, and the amount of data relating to the input signal after the trigger event.

When detecting a trigger event, and accordingly, when the acquisition device 13 receives a trigger signal from the trigger device 12, the acquisition device 13 may store data of a segment of the input signal in one of the signal memories 14-*i*. When a further trigger event is detected, acquisition device 13 may store a further segment of the input signal in a further signal memory 14-*i*. In this way, a separate segment of the input signal is stored in a respective signal memory 14-*i* for each detected trigger event. For example, the data of a first segment may be stored in a first signal memory 14-1, the data of a second trigger event may be stored in a second signal memory 14-2, etc.

If two successive segments relating to two successive trigger events overlap, at least a part of the two segments may be the same. Thus, the overlapping part is stored in two related signal memories 14-*i*. For this purpose, the overlapping part of the first segment stored in a signal memory 14-*i* may be copied to another signal memory 14-*i* for storing the segment relating to the successive trigger event. This will be explained in more detail below.

Figure 2:
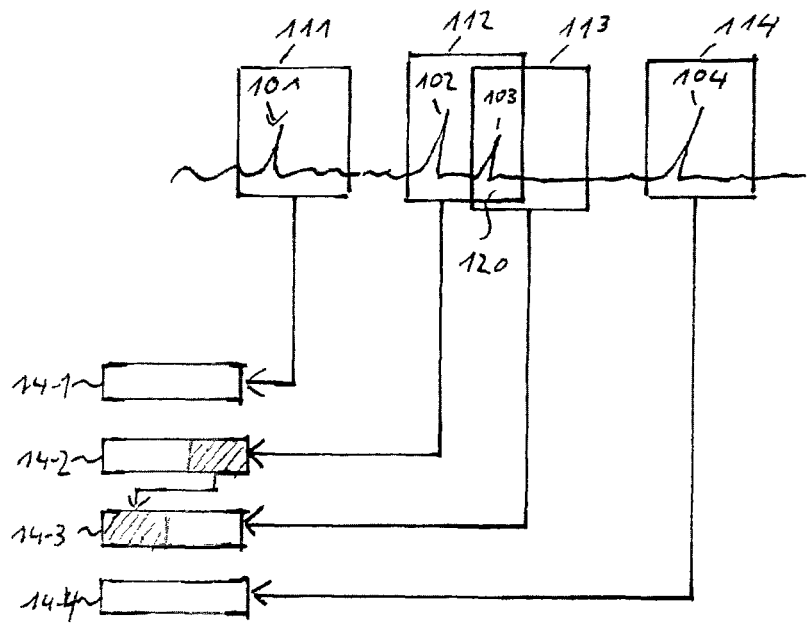
FIG. 2: shows a schematic illustration for explaining the acquisition of a signal acquisition apparatus according to an embodiment.

FIG. 2 shows a schematic illustration for explaining the signal acquisition of a signal acquisition apparatus 1. A received input signal 100 may comprise characteristic elements 101-104 relating to a trigger event. Even though, four characteristic elements 101-104 are shown, the present invention is not limited to the number of four. Moreover, any number of trigger events may be possible. As already explained above, it may be even possible to apply a trigger mode, which shall generate a trigger signal even if no trigger event is detected for a predetermined period of time.

For each trigger event 101-104, the acquisition device 13 may determine a segment 111-114 of the input signal 100. Each segment 111-114 relating to a corresponding trigger event 101-104 is stored in one of the trigger memories 14-1 to 14-4. In particular, a separate trigger memory 14-1-14-4 is used for each of the segments 111-114.

As can be further seen in FIG. 2, it may be possible that segments 112, 113 of two successive trigger events 102, 103 may overlap, at least in part. In such a case, the data of the part, in which the two segments 112, 113 overlap may be identified. The data of the overlapping part 120 may be stored in each signal memory 14-2, 14-3 relating to the respective signal segment. In particular, it may be possible to identify the respective data in the signal memory 14-2 relating to the first of the overlapping segments, and to copy the data of this part into the signal memory 14-3 for storing the successive segment of the overlapping segments.

The signal memories 14-*i* may be separate memories. However, it may be also possible that the signal memories 14-*i* may be specific memory areas of a single memory, for example an acquisition memory 14.

The storage of the signal segments in the signal memories 14-*i* may be performed, for example, in a cyclic manner. For this purpose, the signal memory 14-*i* comprising the oldest data of a signal segment is overwritten when data of a new signal segment is stored in the signal memory 14-*i*.

Figure 3:
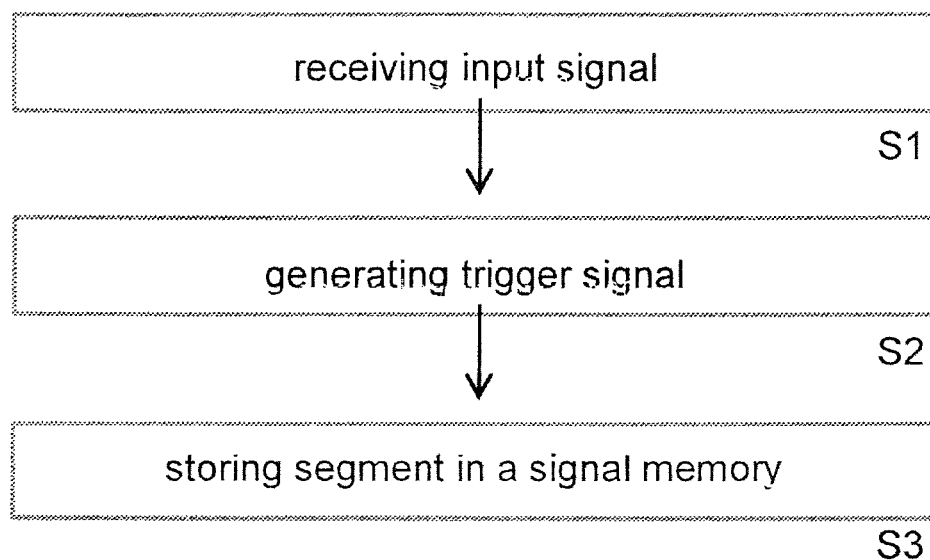
FIG. 3: shows a flow diagram of a signal acquisition method according to an embodiment.

FIG. 3 shows a flow diagram of an acquisition method according to an embodiment. The signal acquisition method may perform any step as already described above in connection with the signal acquisition apparatus 1. Accordingly, the signal acquisition apparatus 1 may perform any operation as described below in connection with the signal acquisition method.

The signal acquisition method comprises a step S1 of receiving an input signal. The input signal may be received, for example, by an input device 11.

In a step S2, trigger signals are generated when a trigger event in the received input signal is detected. In particular, a first trigger signal is generated when detecting a first trigger event, and a second trigger signal is generated when detecting a second trigger event. The generation of the trigger signals may be performed by a trigger device 12.

In a step S3, a predetermined segment of the received input signal is stored in one of a number of signal memories 14-*i*. In particular, a segment of the received input signal may be stored when a generated trigger signal is provided. The storage of the segments of the input signal may be performed by an acquisition device 13. In particular, a first segment of the received input signal is stored in a first signal memory 14-1 when the first trigger signal is generated, and a second segment of the received input signal is stored in a second signal memory 14-2 when the second trigger signal is generated.

The method may comprise identifying an overlapping signal portion between the first segment and the second segment. Further, the method may comprise a step of copying the overlapping signal portion from the first signal memory 14-1 to the second memory 14-2, if an overlapping portion is identified.

The signal memories 14-*i* may be operated in a cyclic manner. In particular, the signal memories may be operated as ring buffers.

The number of signal memories 14-*i* may be memories of an acquisition memory 14.

The acquisition memory 14 may be operated as a cyclic memory. In particular, the acquisition memory 14 may be operated as a ring buffer.

The trigger events, in particular the first trigger event and the second trigger event, may be based on a number of trigger modes and/or a number of trigger conditions.

The number of trigger modes may comprise a first trigger mode of detecting a trigger event in the received input signal.

The number of trigger modes may further comprise a second trigger mode of detecting a lapse of time, in particular a lapse of time without detecting a trigger event.

The number of trigger conditions may comprise at least one of exceeding a predetermined value, falling below a predetermined value, a rising edge, a falling edge or lapsing a predetermined period of time.

The predetermined segment, which is stored in one of the signal memories may comprise a first portion of the input signal before a point of time of the trigger event and a second portion of the input signal following the point of time of the trigger event. In particular, a length of the first portion and/or a length of the second portion may be set individually for each kind of trigger event, in particular for the first trigger event and the second trigger event.

Summarizing, the present invention provides a signal acquisition of a signal based on specific trigger events. In particular, a separate segment of an input signal is stored for each trigger event. Thus, each trigger event generates separate data comprising data relating to a specific period of time in association with a corresponding trigger event.

The invention claimed is:

1. A signal acquisition apparatus comprising:
   an input device for receiving an input signal;
   a number of signal memories comprising at least a first signal memory and a second signal memory;
   a trigger device for generating trigger signals when detecting a trigger event, wherein a first trigger signal is generated when detecting first trigger event and a second trigger signal is generated when detecting a second trigger event; and
   an acquisition device for receiving the trigger signals from the trigger device and storing a predetermined segment of the received input signal in one of the signal memories when a trigger signal is generated;
   wherein a first segment of the received input signal is stored in the first signal memory when the first trigger signal is generated, and a second segment of the received input signal is stored in the second signal memory when the second trigger signal is generated, the first segment and the second segment each relate to data of the received input signal for a predetermined period of time, respectively, and
   wherein the acquisition device is adapted to identify an overlapping signal portion between the first segment and the second segment, and to copy the overlapping signal portion from the first signal memory to the second signal memory, such that the overlapping portion is stored in each of the first and the second signal memories, if an overlapping signal portion is identified, the overlapping portion is a nail of the data in which the first segment and the second segment overlap.

2. The apparatus of claim 1, wherein the signal memories are operated as a cyclic memories, in particular ring buffers.

3. The apparatus of claim 1, comprising an acquisition memory including the number of signal memories.

4. The apparatus of claim 3, wherein the acquisition memory is a cyclic memory, in particular a ring buffer.

5. The apparatus of claim 1, wherein the trigger events, in particular the first trigger event and the second trigger event, are based on a number of trigger modes and/or a number of trigger conditions.

6. The apparatus of claim 5, wherein the number of trigger modes comprises a first trigger mode for detecting an event in the received input signal and a second trigger mode for detecting a lapse of time.

7. The apparatus of claim 5, wherein the number of trigger conditions comprises at least one of exceeding a predetermined value, falling below a predetermined value, a rising edge, a falling edge or lapsing a predetermined period of time.

8. The apparatus of claim 1, wherein the predetermined segment comprises a first portion of the input signal before a point in time of the trigger event and a second portion of the input signal following the point in time of the trigger event.

9. The apparatus of claim 8, wherein a length of the first portion and/or a length of the second portion is set individually for the first trigger event and the second trigger event.

10. A signal acquisition method comprising:
    receiving an input signal;
    generating trigger signals when detecting a trigger event in the received input signal, wherein a first trigger signal is generated when a first trigger event is detected and a second trigger signal is generated when a second trigger event a detected; and
    storing a predetermined segment of the received input signal in one of a number of signal memories when a trigger signal is generated;
    wherein a first segment of the received input signal is stored in a first signal memory when the first trigger signal is generated, and a second segment of the received input signal is stored in a second signal memory when the second trigger signal is generated, the first segment and the second segment each relate to data of the received input for a predetermined period of time, respectively,
    wherein the method further comprises:
    identifying an overlapping signal portion between the first segment and the second segment, and
    copying the overlapping signal portion from the first signal memory to the second signal memory, such that the overlapping portion is stored in each of the first and the second signal memories if an overlapping signal portion is identified, the overlapping portion s a part of the data in which the first segment and the second segment overlap.

11. The method of claim 10, wherein the signal memories are operated as a cyclic memories, in particular ring buffers.

12. The method of claim 10, wherein the number of signal memories are memories of an acquisition memory.

13. The method of claim 12, wherein the acquisition memory is operated as a cyclic memory, in particular a ring buffer.

14. The method of claim 10, wherein the trigger events, in particular the first trigger event and the second trigger event, are based on a number of trigger modes and/or a number of trigger conditions.

15. The method of claim 14, wherein the number of trigger modes comprises a first trigger mode for detecting an event in the received input signal and a second trigger mode for detecting a lapse of time.

16. The method of claim 14, wherein the number of trigger conditions comprises at least one of exceeding a predetermined value, falling below a predetermined value, a rising edge, a falling edge or lapsing a predetermined period of time.

17. The method of claim 10, wherein the predetermined segment comprises a first portion of the input signal before a point in time of the trigger event and a second portion of the input signal following the point in time of the trigger event.

18. The method of claim 17, wherein a length of the first portion and/or a length of the second portion is set individually for the first trigger event and the second trigger event.

* * * * *